Nov. 26, 1935.   B. McCOLLUM   2,021,943

SEISMIC METHOD FOR PROFILING GEOLOGIC FORMATIONS

Filed June 20, 1931

BURTON McCOLLUM
INVENTOR.

BY
ATTORNEYS.

Patented Nov. 26, 1935

2,021,943

UNITED STATES PATENT OFFICE 2,021,943

SEISMIC METHOD FOR PROFILING GEOLOGIC FORMATIONS

Burton McCollum, Houston, Tex., assignor, by mesne assignments, to The Texas Company, a corporation of Delaware Application June 20, 1931, Serial No. 545,697

3 Claims. (Cl. 181—0.5)

My invention relates to a geophysical method of investigating geologic formations. More specifically, my invention consists in a seismic method of profiling the boundary surfaces of subterranean geologic formations. My method is particularly adapted to determining the position of very steep or substantially vertical boundary surfaces such, for example, as are found on the flanks of salt domes, igneous intrusions, dikes, etc. It will be obvious from the specification that other steep boundary surfaces such as fault planes and the steep surfaces of overturned folds can be accurately determined by the invention described. As will appear from the specification, however, steepness of the boundary surface or contact is not essential to operativeness of the invention. This merely being a feature of the invention in that the difficulty of profiling very steep or vertical surfaces of geologic formations has heretofore been a serious limitation of seismic methods of profiling.

While my method is capable of indicating the presence or absence of geologic formations, such is not the essence of my invention. The essence of my invention consists in a method of profiling with practical accuracy the boundary surface of a formation which, in most instances, is already known to exist. The profiling of these boundary surfaces is a matter of considerable practical and economic importance as will appear from the specification and accompanying drawing which illustrates diagrammatically and by way of example the basic principles and applications of my invention.

Figure 1:
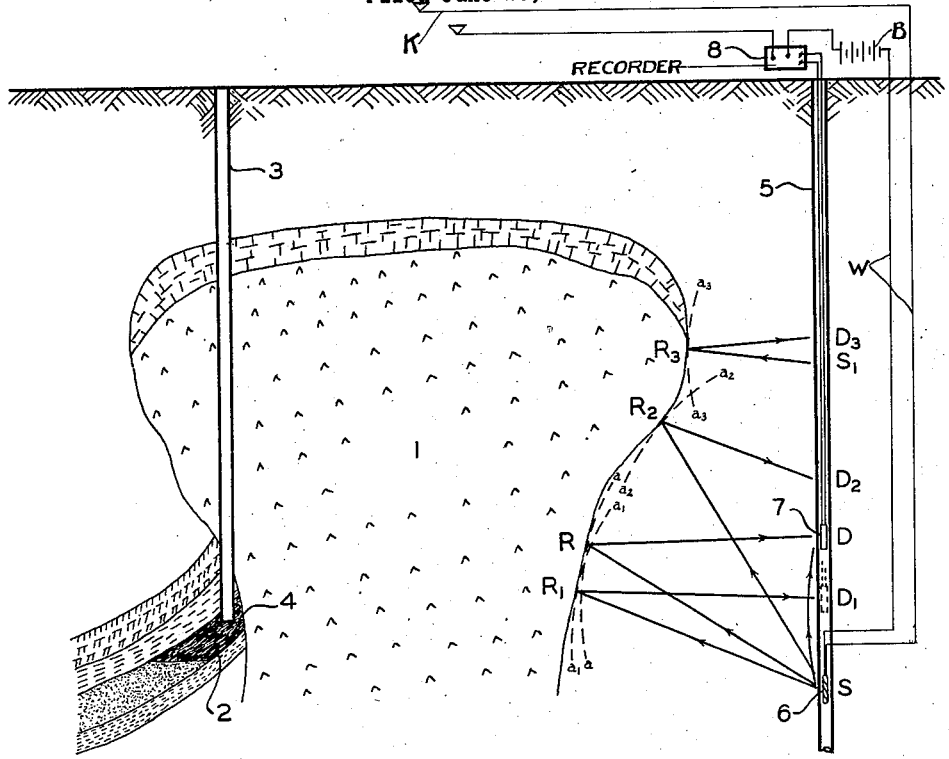
Fig. 1 is a diagram illustrating a practical application of my invention.

By way of illustrating the practical importance of my invention, I have shown in Fig. 1 a typical oil bearing formation adjacent the flank of a "mushroom" salt dome. In the figure the dome is designated by 1 and the oil bearing formation by 2. It is well known in the petroleum producing art, that, because of hydrostatic pressure and water-oil displacement principles, the optimum location for a well to produce oil from the deposit 2 would be such that the bore hole would tap the deposit near its highest point as, for example, well 3. As will be seen on reference to Fig. 1, the highest point of the deposit 2 lies adjacent the flank 4 of the salt dome. It therefore becomes a matter of considerable practical and economic importance to profile the flank of the dome or, in other words, to determine the position of a series of points on the flank 4 with reference to some known point on the surface of the ground. A method of developing such a profile is the essence of my invention.

The basic principles of my profile method will be understood on reference to Fig. 1 of the drawing together with the following description:

In Fig. 1 a source of sound energy 6 is shown at the position S in bore hole 5. This source may be a stick of dynamite or an electric detonating cap such as will generate elastic waves in the earth when fired, or it may be other means for generating such waves as, for example, an electro, mechanical or pneumatic percussion device. In general I prefer explosives, though other means for producing seismic waves may be used. At the position D in bore hole 5 is shown means 7 for detecting seismic waves. I call such seismic wave detecting means a detector. The detector is shown connected by means of electrical conductors to a recorder 8 on the surface of the earth, though the detector and recorder may be component parts of a single instrument capable of being lowered into the bore hole as a unit. The detector 7 may be adjusted to various positions in the bore hole as, for example $D_1$, $D_2$ and $D_3$ by means of a hoisting winch and cable to which the detector is attached. The source 6 may likewise be adjusted to other positions as, for example $S_1$.

After having lowered the detector 7 into the bore hole 5 to some definite position as D, a charge of explosive at position S, for example, is fired by a key K and a battery B which are connected by wires W. These wires would in practice be connected to the charge S through the well 5 but to avoid confusion in the illustration they are shown outside such well. The time of firing is transmitted to the recorder 8 by wire or radio means well understood in the art of seismic exploration. Coincident with the time of firing of the buried explosive a seismic wave will originate at the point S and will be transmitted in all directions through the surrounding geologic formations. In accordance with well known physical laws, a portion of the seismic wave incident on the flank of dome 1 at a point R, for instance, will be reflected to the position D at which the detector 7 is located. When the wave reaches the point D it will actuate detector 7 and its exact time of arrival will be recorded by 8.

Having recorded the time of origin of the seismic wave at S and the time of arrival of the reflected wave at D, I have determined the time $T_{SRD}$ required for the seismic wave to traverse the path SRD.

Figure 2:
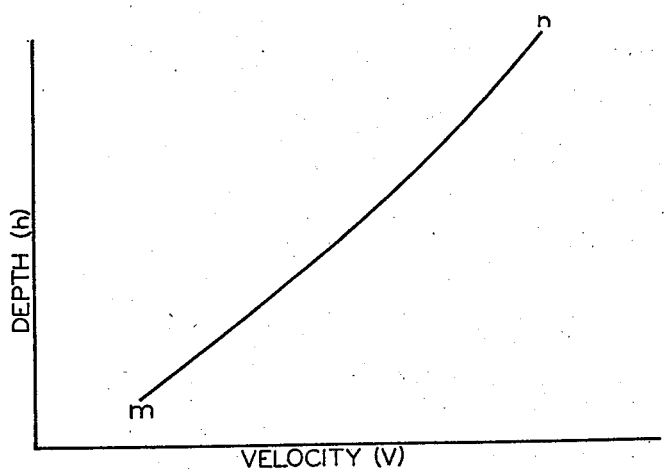
Fig. 2 is a depth-velocity curve.

Previous to the arrival of the reflected wave at D along the path SRD, however, a direct seismic wave from the same shot will have reached the point D over the shorter path in the geologic formations immediately surrounding the bore hole 5. When this direct wave arrives at D it will actuate the detector 7 and the time of arrival will be recorded by 8. Having recorded the time of origin of the seismic wave at S and the time of arrival at D, the time of travel over the known distance SD has been determined; and from these data the average velocity of a seismic wave in the geologic formations intermediate S and D is computed by dividing the distance by the time. The velocity value obtained in this manner is plotted against the average depth of the formations to which it applies. In like manner, other velocity values between other points are determined and plotted against their corresponding depths. This results in a depth-velocity curve similar to $m$—$n$ shown in Fig. 2 where it will be noted that the velocity gradually increases with depth. Such a curve is typical of the unconsolidated geologic formations commonly found in the Texas and Louisiana salt dome region.

Having determined the average velocity of the formations between S and D, I multiply this velocity by the time $T_{SRD}$, required by the reflected wave to travel from S to D. By this operation a very close approximation to the length of the path traversed by the reflected wave is obtained. Next, by using this distance as the summation of the radii and the points S and D as the foci, I determine the arc $a$—$a$ of an ellipse. Then this arc will be the approximate locus of a point on the reflecting surface in a plane passing through the points S and D and intersecting the reflecting surface. In a similar manner, I determine other arcs as $a_1$—$a_1$, $a_2$—$a_2$, and $a_3$—$a_3$. Then, by drawing an enveloping curve tangent to these arcs, I produce a close profile of the salt dome or other geologic formation being investigated.

The points at which the arcs are tangent to the envelope will be, for practical purposes, the points of reflection, as, for instance, R, $R_1$, $R_2$ and $R_3$. Knowing the position of these points, I can now, by referring to the curve $m$—$n$, apply second order corrections or adjustments to the average velocity along each one of the paths as, for instance $SR_2$ and $R_2D_2$, and thereby arrive at a very precise determination of the position of the points of reflection, as for instance, $R_2$. In this manner, I finally determine the position of each of the reflecting points and then draw a continuous curve through these points. This curve will then represent a final and precise determination of the profile of the geologic formations in the plane investigated.

While I have mentioned oil bearing formations in connection with the surface profiled, my invention is obviously not restricted to the profiling of surfaces adjacent to oil bearing formations; but may be applied to the profiling of other geologic surfaces, the position of which it is desirable to ascertain.

Having described my invention, what I claim is:

1. The method of making a profile of a subterranean formation which consists in producing seismic waves at an origin point in the earth's substance adjacent said formation, recording the time of travel to spaced loci substantially vertically in line with said origin point of waves travelling in paths to and reflected from surface points on said formations, recording the time of travel of said waves from the origin point directly to said loci, locating elliptical arcs, each in the same plane and at the same side of said loci and each having the origin point as one focus and one of said loci as the other focus with the corresponding path as a summation of the radii, and locating said profile tangential to said arcs.

2. The steps in the method of making a vertical profile of a subterranean formation which consist in originating seismic waves in a hole in the earth's substance adjacent said formation, recording the instant of the origination of said waves, detecting the time of arrival of the waves reflected from said formation to spaced superposed loci in said hole, and recording the time of travel of said waves from the origin point directly to said loci.

3. The steps in the method of making a vertical profile of a subterranean formation which consist in selectively producing seismic waves at a plurality of origin points at varying depths in a substantially vertical line in the earth's surface adjacent said formation and recording the times of travel of said waves to loci disposed in line with said origin points and spaced at known distances from said points.

BURTON McCOLLUM.